Oct. 4, 1932.   L. C. BROECKER   1,880,405
MACHINE FOR TESTING INTERNAL THREAD IN VALVE STEMS
Filed May 14, 1930   2 Sheets-Sheet 1

INVENTOR
LEWIS C. BROECKER.
BY Ely & Barrow
ATTORNEYS.

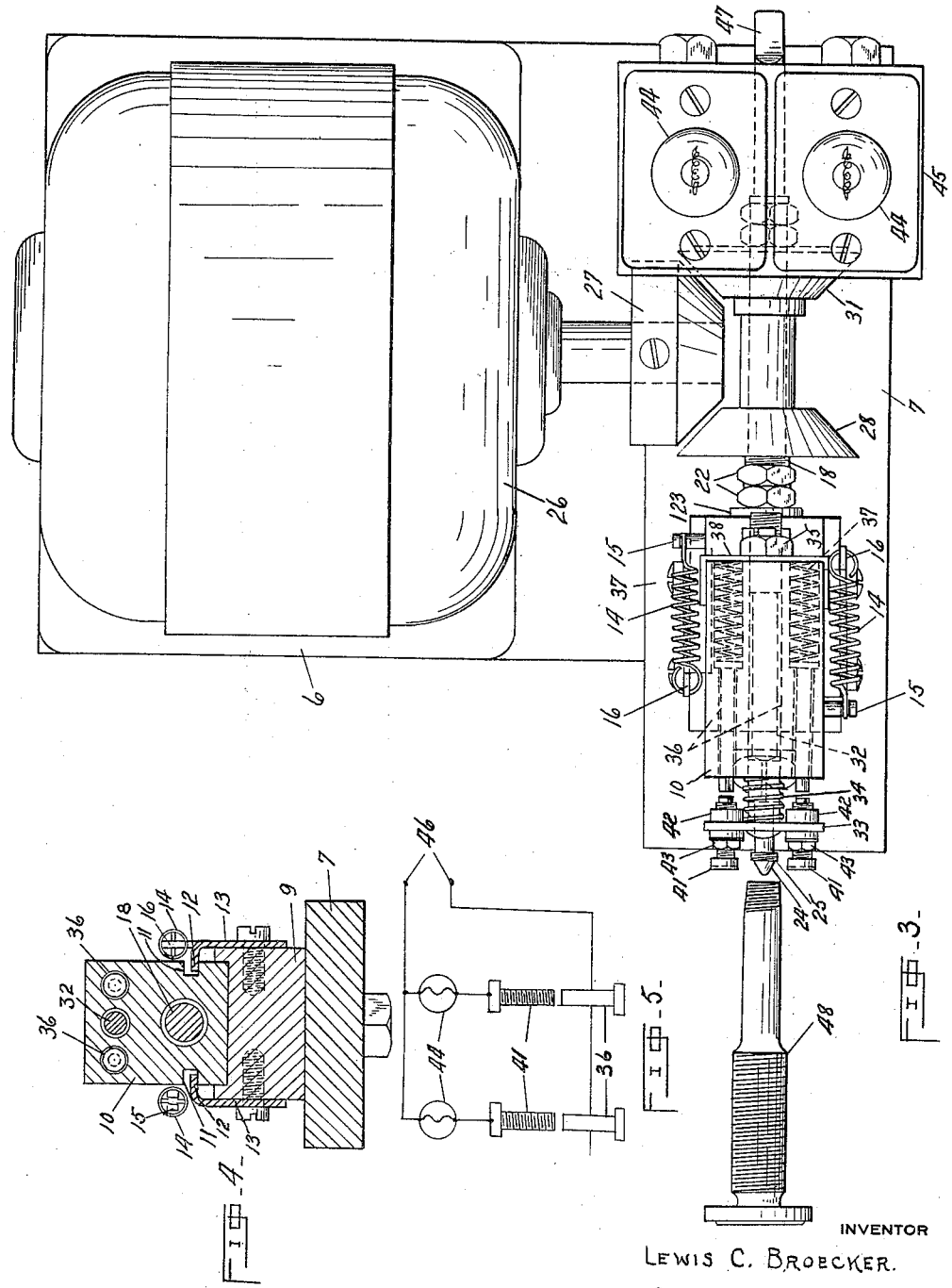

Patented Oct. 4, 1932

1,880,405

UNITED STATES PATENT OFFICE

LEWIS C. BROECKER, OF BRIDGEPORT, CONNECTICUT, ASSIGNOR TO THE FIRESTONE STEEL PRODUCTS COMPANY, OF AKRON, OHIO, A CORPORATION OF OHIO

MACHINE FOR TESTING INTERNAL THREAD IN VALVE STEMS

Application filed May 14, 1930. Serial No. 452,337.

This invention relates to apparatus for testing the internal thread of valve stems.

The general object of the invention is to provide efficient, inexpensive, foolproof means for rapidly and accurately testing the quality and depth of internal thread on small objects such as inner tube valve stems.

A more particular object of the invention resides in the provision of a rotatable threaded spindle adapted to screw into the internal thread of the valve stem, which spindle is reversible by the push or pull of the operator upon the valve stem being tested.

Another object of the invention is to provide a simple signalling system to indicate that the internal thread of the article tested is of the proper depth.

The above and other objects of the invention are achieved by the apparatus illustrated in the accompanying drawings and described below, it being understood that the invention is not limited to the exact details thereof shown and described.

In the drawings,

Figure 3 is a plan thereof;

Figure 4 is a sectional view taken on line 4—4 of Figure 1; and

Figure 5 is a diagrammatic view of the wiring of the signal system.

Figure 1:
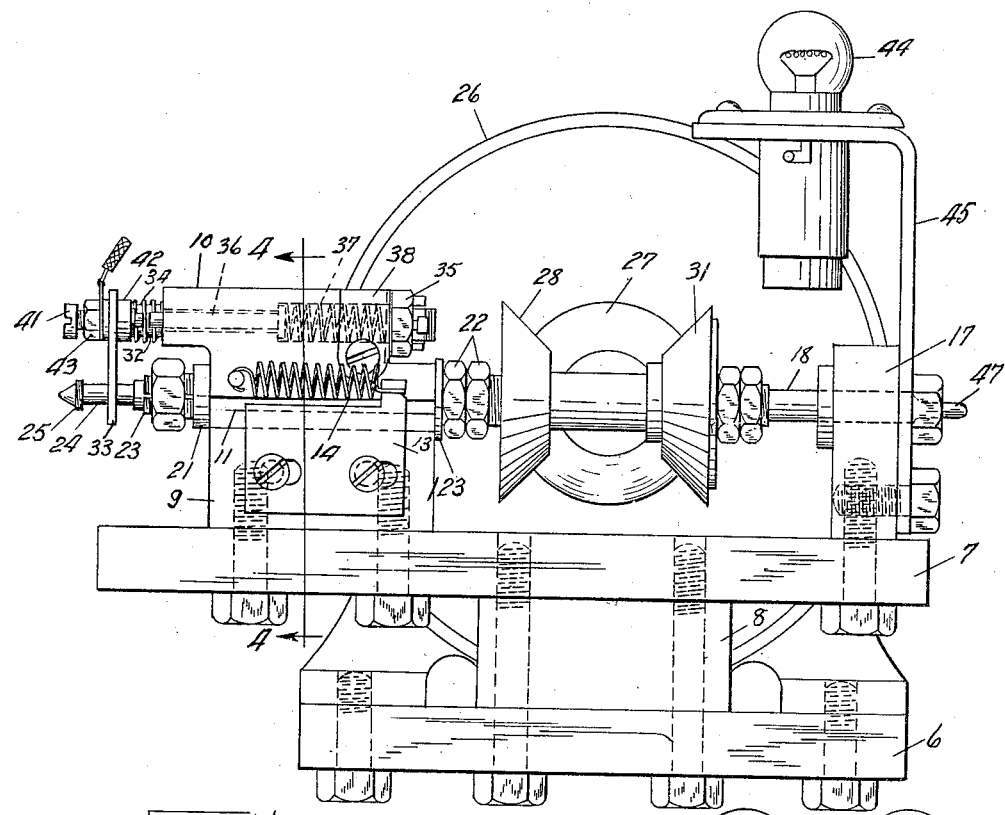
Figure 1 is a side elevation of the apparatus embodying the invention.
Figure 2:
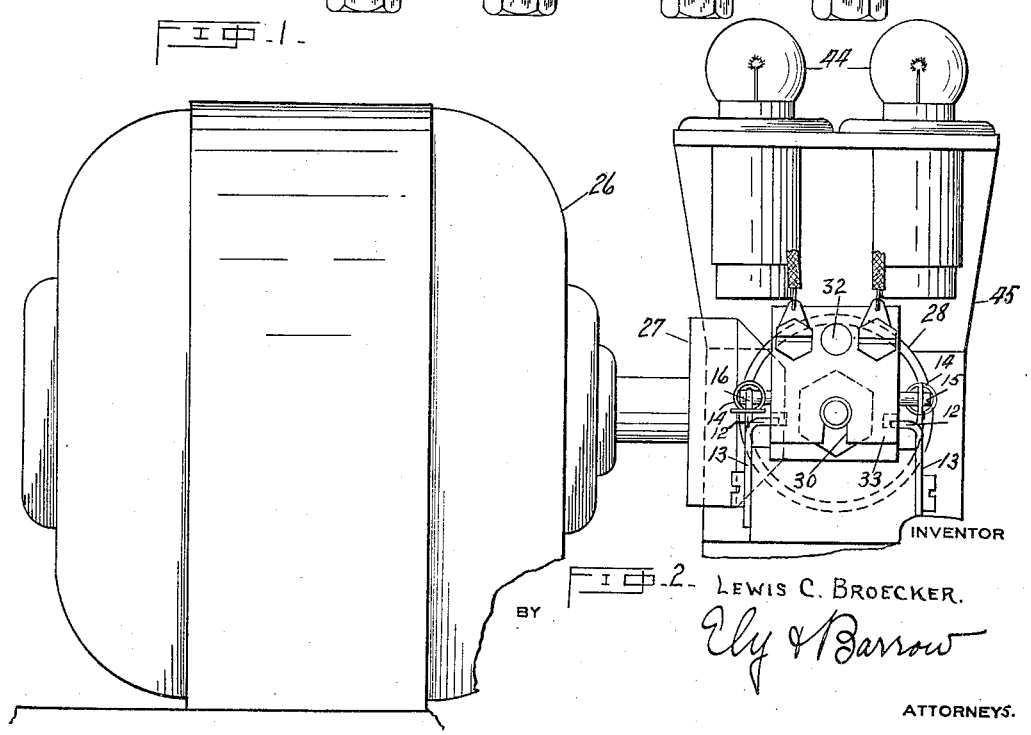
Figure 2 is a front eelvation thereof.

Referring to the drawings, a base 6 carries a table 7 spaced therefrom by a block 8. A guide block 9 secured to one end of the table 7 slidably carries a slide 10 by the provision of grooves 11 in the slide in which engage bent-over lugs 12 of plates 13 secured to the sides of the guide block 9. In order to yieldably position the slide 10 on the guide block 9, a pair of oppositely acting springs 14 are provided which, as seen best in Figure 3, are hooked over pins 15 extending from opposite ends of the slide and over upstanding lugs 16 on opposite ends of the side plates 13.

The numeral 17 indicates an end block which slidably journals one end of a shaft 18, the other end of the shaft being journaled in the slide 10. A shoulder 21 on the shaft 18, a pair of lock nuts 22 and a keyed washer 123 prevent longitudinal but allow rotary movement of the shaft 18 with respect to the slide 10. The forward end of the shaft 18 is formed as a chuck 23 which is adapted to removably carry a spindle 24 threaded as at 25.

To drive the shaft 18, a motor 26 is secured to the base 6 and is provided with a driving cone 27 on the motor shaft which cooperates with either of a pair of cones 28 and 31 secured to the shaft 18. The cones 27 and 28 are of metal while the cone 31 is of rubber as hereinafter explained.

As seen in Figures 3 and 4 the slide 10 is formed with a longitudinal bore which receives a gauge pin 32. A gauge plate 33 slotted as at 30 for the reception of the spindle 24 is secured to the forward end of the gauge pin. A compression spring 34 on the gauge pin 32 acting between the end of the slide and the plate 33 serves to yieldingly hold the gauge pin and plate at the outward extent of their movement as adjustably limited by a nut 35 threaded on the end of the gauge pin.

A pair of offset holes are provided in the slide at either side of the gauge pin 32 to receive headed contact pins 36. The outward movement of the pins in the slide is limited by the heads of the pins contacting with the shoulders in the offset holes and the inward movement thereof is yieldable against the action of springs 37. A clip 38 secured to the back of the slide 10 serves to retain the springs 37 in place.

Cooperating with the contact pins 36 are a pair of contact screws 41 tapped in insulating bushings 42 extending through the gauge plate 33. Lock nuts 43 on the screws 41 serve to clamp the screws in any adjusted position.

A pair of signalling lamps 44 carried on a bracket 45 secured to the block 17 are connected by leads 46 to a suitable source of power through the screws 41 and contact pins 36 as illustrated in Figure 5. One of the leads 46 is connected to the frame of the apparatus, the current flowing through the frame to the contact pins 36. The other of the leads is connected through the lamps 44 to the contact screws 41 which are insulated from the frame of the apparatus by the insulating bushings 42.

In the operation of the device a spindle 24 having a thread 25 thereon of the desired form is inserted and tightened in the chuck 23. The back end of the shaft 18 may be flattened as at 47 to allow a wrench to be applied to the shaft to hold it from turning during this operation. The motor 26 is now started, however no motion will be transmitted to the shaft 18 as the springs 14 pulling in opposite directions will position the slide 10 and shaft 18 so that the driving cone 27 on the motor shaft will be midway between the cones 28 and 31 on the shaft 18.

A valve stem, indicated at 48 in Figure 3, having an internal thread which should cooperate with the thread 25 on the spindle 24, is now pushed by the operator against the end of the spindle. Forcing the valve stem 48 against the spindle will move the shaft 18 back in the block 17 and will also carry the slide 10 back in the guide block 9 against the action of one of the springs 14. The backward movement of the shaft 18 carries the metal cone 28 on the shaft into driving relation with the metal driving cone 27 which rotates the shaft 18 so that the thread 25 on the spindle will turn into the internal thread in the valve stem if the internal thread is properly formed.

As the rotation of the spindle carries the valve stem farther onto the spindle the end of the stem will contact with the gauge plate 33 which will begin to move against the action of the spring 34. As shown in Figures 3 and 5 the screws 41 are adjusted to extend at different distances from the gauge plate 33. In this manner the one screw will contact first with its contact pin 36 to light one of the signal lamps 44 indicating that the internal thread is at least deep enough. If the thread is of the proper depth the thread 25 on the spindle will arrive at the end of the internal thread and the drive between the metal cones 27 and 28 will slip so that the shaft 18 will no longer be rotated. If however, the thread is too deep the spindle will continue to screw into the stem and the second screw 41 will engage with its contacting pin 36 to light the second lamp 44, indicating the thread is too deep and that the stem must be discarded. If neither lamp 44 goes on before the drive slips, the internal thread is too short and the valve stem must be discarded also. When one screw 41 has contacted with its contact pin 36, the spring 37 behind the contact pin 36 allows continued relative movement of the gauge plate 33 and the slide as will be evident.

In all events, whether the internal thread is of the proper depth or is too short or too deep, the operator after the depth has been determined pulls back on the valve stem so that the shaft 18 and slide 10 are pulled forward, thus disengaging metal cone 28 from the driving cone 27 and engaging the rubber cone 31 with the driving cone. This will reverse the direction of rotation of the shaft 18 and will screw the spindle out of the valve stem. The cone 31 is made of rubber to give a substantially positive reverse drive to the shaft 18 and spindle 24 so that if the spindle has bound somewhat at the end of the internal thread of the valve stem it will nevertheless be turned back out of the stem. When the stem is removed from the spindle the springs 14 will move the slide 10 and shaft 18 to the neutral non-rotating initial position.

The contact screws 41 and the nut 35 can be adjusted so that the apparatus can be used to indicate any desired depth and limits. As seen in Figure 1, the side plates 13 are secured to the guide block 9 by cap screws extending through slotted holes in the side plates, which construction allows the side plates to be adjusted along the guide block, thus varying the tension in the springs 14.

While the invention has been particularly described for the testing of valve stems, it will be evident that the apparatus may be used wherever an internal thread must be tested for proper depth. Again by changing the spindle to a suitable die the apparatus could be used to test external thread.

As many other changes could be made in the construction, it is intended that all matter contained in the above description or shown in the accompanying drawings shall be interpreted as illustrative only and not in a limiting sense. Accordingly, various modifications and applications of the invention can be resorted to without departing from the spirit of the invention or the scope of the appended claims.

What is claimed is:

1. Apparatus for testing the depth of the threads of internally threaded articles, comprising a guide, a slide yieldably positioned on said guide, a shaft journaled in said slide and movable axially with movement of the slide, a pair of spaced oppositely positioned cones on said shaft, a driving cone adapted to cooperate with either of said cones upon movement of the slide, a chuck at one end of said shaft, a threaded spindle in said chuck, a plate resiliently positioned in relation to said slide, said spindle extending through said plate, a pair of contact screws carried by, but insulated from, said plate, a pair of contact pins yieldably positioned in said slide and cooperating with said contact screws, and signalling means connected to said contact screws and pins.

2. Apparatus for testing the depth of the threads of internally threaded articles, comprising a guide, a slide yieldably positioned on said guide, a shaft journaled in said slide and movable axially with movement of the slide, a pair of spaced oppositely positioned cones on said shaft, a driving cone adapted to cooperate with either of said cones upon movement of the slide, a chuck at one end of said shaft, a threaded spindle in said chuck, a plate resiliently positioned in relation to said slide, said spindle extending through said plate, a contact screw carried by, but insulated from, said plate, a contact pin yieldably positioned in said slide and cooperating with said contact screw, and signalling means connected to said contact screw and pin.

3. Apparatus for testing the depth of the threads of internally threaded articles, comprising a guide, a slide yieldably positioned on said guide, a shaft journaled in said slide and movable axially with movement of the slide, a pair of spaced oppositely positioned cones on said shaft, a driving cone adapted to cooperate with either of said cones upon movement of the slide, a threaded spindle at one end of said shaft, a plate resiliently positioned in relation to said slide, said spindle extending through said plate, a contact screw carried by, but insulated from, said plate, a contact pin yieldably positioned in said slide and cooperating with said contact screw, and signalling means connected to said contact screw and pin.

4. Apparatus for testing the depth of the threads of internally threaded articles, comprising a guide, a slide on said guide, a shaft journaled in said slide and movable axially therewith, a pair of spaced oppositely positioned cones on said shaft, a driving cone adapted to cooperate with either of said cones upon movement of the slide, a threaded spindle at one end of said shaft, a plate resiliently positioned in relation to said slide, said spindle extending through said plate, a contact screw carried by said plate, a contact pin yieldably positioned in said slide and cooperating with said contact screw, and indicating means connected to said contact screw and pin.

5. Apparatus for testing the depth of the threads of internally threaded articles, comprising a guide, a slide yieldably positioned on said guide, a shaft journaled in said slide and movable axially therewith, a pair of spaced oppositely positioned cones on said shaft, a driving cone adapted to cooperate with either of said cones upon movement of the slide, a threaded spindle at one end of said shaft, a plate resiliently positioned in relation to said slide, said spindle extending through said plate, signalling means, and cooperating means on said plate and slide for operating said signalling means upon relative movement of the plate and slide.

6. Apparatus for testing the depth of the threads of internally threaded articles, comprising a guide, a slide yieldably positioned on said guide, a shaft journaled in said slide and movable axially therewith, a pair of spaced opositely positioned drivable means on said shaft, a driving means adapted to cooperate with either of said drivable means upon movement of the slide, a threaded spindle at one end of said shaft, a plate resiliently positioned in relation to said slide, said spindle extending through said plate, signalling means, and cooperating means on said plate and slide for operating said signalling means upon relative movement of the plate and slide.

7. In mechanism for testing the depth of internal threads in valve stems, a guide block, a slide carried thereby, a shaft journaled in and movable with said slide, a threaded spindle removably secured to the end of said shaft, means mounted upon the slide and actuated by the screwing of the spindle into a valve stem being tested to indicate the depth of the internal thread, means adapted to drive said shaft, and means on said shaft adapted to cooperate with said last-named means so that with the slide in one position the shaft will be rotated in one direction and with the slide in another position the shaft will be rotated in the reverse direction.

8. In mechanism for testing the depth of internal threads in articles, a guide block, a slide carried thereby, a shaft journaled in and movable with said slide, a threaded spindle removably sceured to the end of said shaft, means mounted upon the slide and actuated by the screwing of the spindle into an article being tested to indicate the depth of the internal thread, means for rotating said shaft, and means for reversing the direction of rotation of the shaft upon movement of the slide in the guide block.

9. In mechanism for testing the depth of internal threads in articles, a slide, a shaft journaled in and movable with said slide, a threaded spindle removably secured to the end of said shaft, means mounted upon the slide and actuated by the screwing of the spindle into an article being tested to indicate the depth of the internal thread, means adapted to drive said shaft, and means on said shaft adapted to cooperate with said last-named means so that with the slide in one position the shaft will be rotated in one direction and with the slide in another position the shaft will be rotated in the reverse direction.

In witness whereof I have hereunto set my hand this 8th day of May, 1930.

LEWIS C. BROECKER.